United States Patent [19]

Geibel et al.

[11] Patent Number: 4,877,850

[45] Date of Patent: Oct. 31, 1989

[54] BUFFER WASH OF POLYARYLENE SULFIDES

[75] Inventors: Jon F. Geibel; Afif Nesheiwat, both of Bartlesville, Okla.

[73] Assignee: Phillips Petroleum Company, Bartlesville, Okla.

[21] Appl. No.: 158,438

[22] Filed: Feb. 22, 1988

[51] Int. Cl.[4] .............................................. C08G 75/14

[52] U.S. Cl. .................................... 525/471; 525/534; 525/537; 528/388; 528/486; 528/487; 528/490; 528/499

[58] Field of Search ................ 525/537, 471; 528/388, 528/486, 487, 490

[56] References Cited

U.S. PATENT DOCUMENTS

| | | | |
|---|---|---|---|
| 3,457,242 | 7/1969 | Hill, Jr. | 260/79 |
| 3,658,753 | 4/1972 | Reed et al. | 260/45.7 |
| 3,839,301 | 10/1974 | Scoggins | 260/79 |
| 3,879,355 | 4/1975 | Blackwell | 260/79 |
| 3,948,865 | 4/1976 | Brady et al. | 260/79 |
| 4,178,433 | 12/1979 | Smith | 528/381 |
| 4,373,091 | 2/1983 | Edmonds, Jr. | 528/481 |
| 4,424,338 | 1/1984 | Cleary | 528/388 |
| 4,433,138 | 2/1984 | Idel et al. | 528/388 |
| 4,500,702 | 2/1985 | Ostlinning et al. | 528/388 |
| 4,588,789 | 5/1986 | Scoggins et al. | 525/537 |
| 4,728,723 | 3/1988 | Nakamura et al. | 528/486 |
| 4,769,426 | 9/1988 | Iwasaki et al. | 528/388 |

FOREIGN PATENT DOCUMENTS

| | | |
|---|---|---|
| 0087038 | 8/1983 | European Pat. Off. . |
| 0216116 | 4/1987 | European Pat. Off. . |
| 0242617 | 10/1987 | European Pat. Off. . |
| 0244187 | 11/1987 | European Pat. Off. . |
| 3205992 | 9/1983 | Fed. Rep. of Germany . |
| 0185625 | 10/1983 | Japan . |

*Primary Examiner*—John C. Bleutge
*Assistant Examiner*—David W. Woodward
*Attorney, Agent, or Firm*—Richmond, Phillips, Hitchcock & Umphlett

[57] ABSTRACT

In one embodiment, a process is provided for treating virgin arylene sulfide resins, wherein a heated polymer slurry, comprising a virgin arylene sulfide resin and water, is contacted by a buffer solution having a pH less than about 9.35 but greater than that necessary to result in at least a partial curing of the virgin arylene sulfide resin. In a further embodiment, a process is provided for treating a virgin arylene sulfide resin, wherein a virgin arylene sulfide resin is slurried in a buffer solution having a pH less than about 9.35 but greater than that necessary to result in at least a partial curing of the virgin arylene sulfide resin. The treating process of this invention is conducted at an elevated temperature, below the melting point of the virgin arylene sulfide resin, while in the substantial absence of a gaseous oxidizing atmosphere. The treated arylene sulfide resins are recovered from the polymer slurry in a manner which does not result in at least a partial curing of the treated resin.

62 Claims, 2 Drawing Sheets

BUFFER WASH OF POLYARYLENE SULFIDES

FIELD OF THE INVENTION

This invention relates arylene sulfide polymers. It relates broadly to a method for treating virgin arylene sulfide polymers. In a specific aspect, the invention relates to the production of thermally stable arylene sulfide resins having improved melt flow rates, and/or rates of cure, and products produced therefrom.

BACKGROUND

Arylene sulfide polymers have become commercially important resins. The products prepared therefrom are finding increasing utility because of their outstanding durability, toughness, inertness, and versatility. Such resins, although having relatively high melting points, are thermoplastic.

The virgin (i.e., substantially linear and uncured) arylene sulfide resins generally have a relatively high melt flow (e.g., about 3000 to about 10,000 grams/10 minutes). For some purposes, such as encapsulation and coating, it is desirable to have arylene sulfide resins with a melt flow greater than about 15,000 grams/10 minutes. However, for other purposes, such as molding, film making and fiber making, the resins should have a melt flow in the range from about 10 to about 3,000 grams/10 minutes. Since virgin arylene sulfide resins generally have a melt flow ranging from about 3000 to about 10,000 grams/10 minutes, if such resins are to be employed in moldings or the making of polymeric films and/or fibers, the virgin resins must have their melt flow values decreased. Conversely, if such polymeric resins are to be employed for the purposes of encapsulation and/or coating, the virgin arylene sulfide resins must have their melt flow values increased.

One conventional method of decreasing the melt flow of virgin arylene sulfide resins, which is synonymous with increasing the virgin resins' molecular weight, is by a process referred to in the industry as "curing". Both, the extent to which the resin is cured and the final melt flow value obtained are controlled depending upon the intended end use of the polymer. One method of curing an arylene sulfide resin is to subject the resin to an elevated temperature below its melting point while in the presence of a gaseous oxidizing atmosphere. This method of curing virgin arylene sulfide resins is generally long and tedious.

It is known that the rate at which a virgin arylene sulfide resin cures is generally proportional to the temperature at which the resin is being cured. Therefore, one method of increasing the rate at which a virgin resin is cured is by employing a higher curing temperature. However, since it is often desirable to maintain the curing temperature below the melting point of the resin, the extent that the temperature may be increased is limited by the specific resin's melting point. Accordingly, it is an object of this invention to provide a process for increasing the rate at which arylene sulfide resins cure without increasing the curing temperature.

Furthermore, it is also desirable to have virgin arylene sulfide resins which are thermally stable in the melt. In other words, it is desirable to have arylene sulfide resins whose melt flow values do not substantially change while the resins are held at a temperature above their melting point for a period of time, such as, for example, during molding and extrusion procedures. Accordingly, another object of this invention is to provide a process for preparing thermally stable arylene sulfide resins.

A further object of this invention is to provide a process to treat arylene sulfide resins to have varying melt flow values to meet specific fields of utility.

Other objects, aspects and advantages of the invention will be apparent to those skilled in the art upon reading the specification and appended claims.

SUMMARY OF THE INVENTION

In accordance with one embodiment of this invention, a process is provided for treating a virgin arylene sulfide resin comprising: (a) slurrying the virgin arylene sulfide resin with a buffer solution having a pH less than about 9.35 but greater than that which is necessary to result in at least a partial curing of the virgin arylene sulfide resin, (b) treating the virgin arylene sulfide resin by heating the polymer slurry, while in the substantial absence of a gaseous oxidizing atmosphere, to an elevated temperature below the melting point of the virgin arylene sulfide resin, and (c) recovering the treated arylene sulfide resin from the polymeric slurry in a manner which does not result in at least a partial curing of the treated arylene sulfide resin.

In accordance with another embodiment of this invention, a process is provided for treating a virgin arylene sulfide resin comprising: (a) slurrying the virgin arylene sulfide resin with water, (b) heating the polymer slurry, while in the substantial absence of a gaseous oxidizing atmosphere, to an elevated temperature below the melting point of the virgin arylene sulfide resin, (c) treating the virgin arylene sulfide resin by adding to the polymer slurry, while in the substantial absence of a gaseous oxidizing atmosphere, a buffer solution having a pH less than about 9.35 but greater than that which is necessary to result in at least a partial curing of the virgin arylene sulfide resin, and (d) recovering the treated arylene sulfide resin from the polymer slurry in a manner which does not result in at least a partial curing of the treated arylene sulfide resin.

Both above embodiments of this invention result in thermally stable polymeric resins which have higher melt flow values and which cure faster than their untreated counterparts.

BRIEF DESCRIPTION OF THE DRAWINGS

A more complete appreciation of the invention and many attendant advantages thereof will be readily obtained as the same becomes better understood by reference to the following detailed description when considered in connection with the accompanying figures briefly described below.

DETAILED DESCRIPTION

Figure 1:
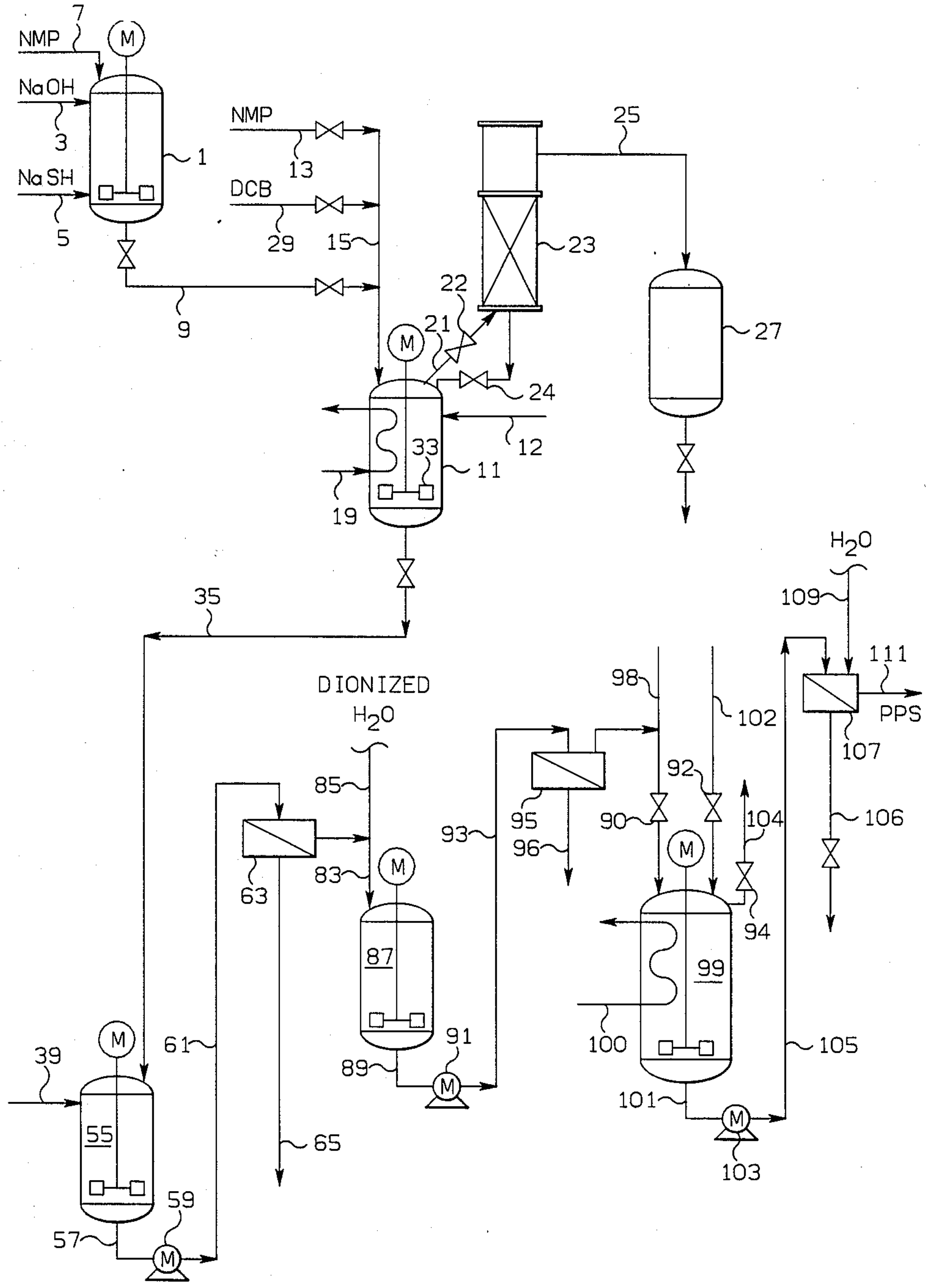
FIG. 1 is a schematic representation of a process for preparing a treated poly(phenylene sulfide) resin in accordance with the embodiments of this invention.

The term "arylene sulfide polymer", as used in this specification, is intended to include polymers of the type which are prepared by reacting dihaloaromatic compounds with a sulfur source in the presence of a polar organic compound. The resulting polymers contain the aromatic structure of the dihalo compound coupled in repeating units through a sulfur atom.

This invention is broadly applicable to virgin arylene sulfide resins wherein dihalo-substituted aromatic compounds are reacted with sulfur-containing reactants in a polar organic compound, either in batch or continuous operations. Generally, the polymers which are prepared for use in this invention, because of the availability of the materials from which they are prepared, are those having the repeating unit R-S, wherein R is phenylene, biphenylene, naphthylene, biphenylene ether, or a lower alkyl-substituted derivative thereof. The phrase "lower alkyl", as used herein, refers to alkyl groups having 1 to 6 carbon atoms. Examples of such lower alkyls include, but are not limited to, methyl, propyl, isobutyl, n-hexyl, and the like. Moreover, preferred polymers generally have melting points above 200° C. (392°0 F.), more preferably, in the range from about 200° C. (392° F.) to about 500° C. (932° F.).

Although other polymeric resins are not excluded, in general, the virgin arylene sulfide polymers, treated by the process of this invention, are virgin poly(arylene sulfide)s, wherein the arylene group is a phenylene group. Generally, the process of this invention can be used to improve the properties of virgin poly(arylene sulfide) polymers selected from the group comprising poly(phenylene sulfide), poly(phenylene sulfide ketone), poly(phenylene sulfide diketone), and poly(-biphenylene sulfide).

The term "virgin", when used to identify a type of arylene sulfide resin, refers to substantially linear, low molecular weight resins which have not been subjected to any oxidative heat treatment (i.e., curing), and wherein no molecular weight modifying agents have been used in the production of the resins. Examples of molecular weight modifying agents include, but are not limited to, alkali metal carboxylates and trichlorobenzene.

As used herein, the term "melt flow" refers to the rate at which a melted arylene sulfide resin flows through an orifice when subjected to a downward pressure. Melt flow values are recorded in units of grams of extrudate collected over a 10 minute interval (g/10 min) and as determined herein, are based on a modified version of ASTM D1238, Procedure B. Specifically, in determining the melt flow value for poly(phenylene sulfide) resins, having a melting point of about 285° C. (545° F.), the resin is subjected to test conditions 315/5.0, where the temperature, in degrees Celsius, is shown first followed by the weight of the driving mass, in kilograms. The modification employed is that the preheating time is 5 minutes, as opposed to the minimum 6 minute period which ASTM D1238 specifies.

As used herein, the term "thermal stability" refers to the degree of change in the melt flow values of a resin sample while the resin is held at a temperature above its melting point for different periods of time. As the thermal stability of a given resin improves, the degree at which the resin's melt flow value changes over time decreases. Generally, a resin's thermal stability is determined by measuring a resin's melt flow value, in accordance with the modified procedure described above, after being retained in the barrel of the melt flow index apparatus of ASTM D1238 for 5 minutes and for 30 minutes, while internal temperature of the apparatus is maintained at or slightly above the melting point of the resin being tested. Specifically, when testing the thermal stability of poly(phenylene sulfide) which has a melting point of about 285° C. (545° F.), the internal temperature of the apparatus of ASTM D1238 is maintained at approximately 600° F. (315° C.). If there is little or no change between the 5 minute and the 30 minute melt flow values, the resin being tested is said to be thermally stable. For purposes of this invention, if the 30 minute melt flow value of a resin changes by less than 50 percent of the 5 minute melt flow value, the resin is said to be thermally stable.

The phrase "polymer slurry", as used herein, refers to a slurry comprising a particulate polymer resin and a liquid medium. Generally the amount of arylene sulfide resin present in the polymer slurry ranges from about 1 weight percent to about 50 weight percent, preferably from about 5 weight percent to about 40 weight percent, even more preferably from about 10 weight percent to about 30 weight percent. The above weight percentages are based on the total weight of the polymer slurry.

As used herein, the phrases "buffer solution" or "buffer" refer to aqueous solutions comprising weak acids (or bases) and their respective corresponding salts.

In accordance with one embodiment of this invention, a process is provided for treating a virgin arylene sulfide resin comprising: (a) slurrying the virgin arylene sulfide resin with a buffer solution having a pH less than about 9.35 but greater than that which is the amount necessary to result in at least a partial curing of the virgin arylene sulfide resin, (b) treating the virgin arylene sulfide resin by heating the polymer slurry, while in the substantial absence of a gaseous oxidizing atmosphere, to an elevated temperature below the melting point of the virgin arylene sulfide resin, and (c) recovering the treated arylene sulfide resin from the polymer slurry in a manner which does not result in at least a partial curing of the treated arylene sulfide resin.

In accordance with another embodiment of this invention, a process is provided for treating a virgin arylene sulfide resin comprising: (a) slurrying the virgin arylene sulfide resin with water, (b) heating the polymer slurry, while in the substantial absence of a gaseous oxidizing atmosphere, to an elevated temperture below the melting point of the virgin arylene sulfide resin, (c) treating the virgin arylene sulfide resin by adding to the heated polymer slurry, while in the substantial absence of a gaseous oxidizing atmosphere, a buffer solution having a pH less than about 9.35 but greater than that which is necessary to result in at least a partial curing of the virgin arylene sulfide resin and (d) recovering the treated arylene sulfide resin from the polymer slurry in a manner which does not result in at least a partial curing of the treated arylene sulfide resin.

Both above embodiments of this invention result in thermally stable polymeric resins which have higher melt flow values and which cure faster than their untreated counterparts.

Any suitable buffer solution, having a pH less than about 9.35 but greater than that necessary to result in at least a partial curing of the virgin PAS resin can be used to treat the virgin arylene sulfide resin in accordance with this invention. The lower pH limit of a buffer solution will depend upon the oxidative strength of the particular buffer. In other words, the lower pH limit of a buffer solution is determined by the ability of the specific buffer to oxidize the arylene sulfide resin. Since different buffer solutions have different oxidative tendencies and since the pH of the treating solution should be such that it does not result in at least a partial curing of the resin, the lower pH limit will depend upon the specific buffer selected to treat the virgin resin.

The lower pH limit of a buffer solution having strong oxidative tendencies will be greater than the lower pH tendencies of a buffer solution having weak oxidative tendencies. These lower pH limits, which vary with the oxidative strength of the particular buffer solution employed, can readily be determined by one skilled in the art. Examples of suitable buffer solutions include, but are not limited to, $H_2PO_4^{-1}/HPO_4^{-2}$ having a pH of 7, $NH_3/\ NH_4^{+1}$ having a pH of 9.25, and $CH_3COOH/CH_3COO^{-1}$ having a pH of 3.75. The preferred buffer solution is $CH_3COOH/CH_3COO^{-1}$.

As stated above, when practicing the embodiments of this invention, the pH of the buffer solution must be less than about 9.35 but greater than that which is necessary to result in at least a partial curing of the virgin arylene sulfide resin. Specifically, the pH of the buffer solution must be such that it effectively treats the virgin arylene sulfide resin while not oxidatively curing the resin during the treating process. In other words, the pH of the buffer solution must be such that, when the buffer solution contacts the virgin arylene sulfide resin, at an elevated temperature, below the melting point of the virgin rein, the buffer solution does not result in a decrease of the resin's melt flow value. Preferably, the pH of the buffer solution will range from about 2 to about 9.30, more preferably from about 4 to about 9.25.

In determining the amount of a particular buffer solution to use, it is important to add enough buffer solution such that the buffer capacity, of that particular buffer, is not exceeded during the treating process. As used herein, the phrase "buffer capacity" refers to the number of moles of strong acid (or base) required to effect a unit change in pH in one liter of a buffer solution. Typically, higher values of buffer capacities are desirable. These buffer capacities can be achieved by using high concentrations of reactants in the buffer solutions. Generally, maximum buffer capacity is achieved when the disassociation constant of the weak acid (or base) is equal to the desired hydrogen (for hydroxide) concentration.

When treating a virgin arylene sulfide resin in accordance with this invention, the treating process is conducted at a temperature below the melting point of the virgin resin. Generally, the treating process will be conducted at a temperature within the range from about 1° C. to about 165° C. below the melting point of the virgin resin, preferably, in the range from about 14° C. to about 150° C. below the melting point of the virgin resin.

The concentration of the virgin arylene sulfide resin in the polymeric slurry is such that the buffer solution sufficiently contacts the virgin resin. Generally, the concentration of the virgin arylene sulfide resin in the polymer slurry will range from about 1 weight percent to about 50 weight percent. Preferably from about 5 weight percent to about 40 weight percent, and even more preferably from about 10 weight percent to about 30 weight percent, wherein the above weight percentages are based on the total weight of the polymer slurry.

This invention can be used to treat virgin arylene sulfide resins at any point in time after the resins have been polymerized but before they have been subjected to an oxidative curing process. For example, this invention can be used to treat virgin arylene sulfide resins before or after the resins are recovered from the polymerization reaction mixture effluent. In commercial applications, however, it is preferable to treat the virgin arylene sulfide resin during the recovery process of the virgin resin from the polymerization reaction mixture.

To demonstrate one method of incorporating the embodiments of this invention, a polymerization reaction process is described below. The polymerization process is illustrated by FIG. 1 which is a schematic representation of a process for producing and treating a virgin arylene sulfide resin in accordance with this invention. The specific arylene sulfide resin used in this demonstration is poly(phenylene sulfide).

Referring now to FIG. 1 aqueous solutions of a caustic solution (e.g., NaOH) and an alkali metal hydrosulfide (e.g., NaSH) are fed into stirred vessel 1 through lines 3 and 5, respectively and allowed to react. A polar organic compound (e.g., N-methyl-2-pyrrolidone "NMP") is fed through line 7 into stirred vessel 1 to flush all of the material from vessel 1 through line 9 into stirred vessel 11 which serves as a dehydration/polymerization reactor.

A second charge of a polar organic compound (e.g., NMP) is fed through line 13 into line 15 which introduces the NMP into the dehydration/polymerization vessel 11. The contents of vessel 11 are then heated by heating coils 19 to a temperature sufficient to dehydrate the mixture therein. Rising vapors, passing through line 21, are fractionated in distillation column 23. Condensed water is passed through line 25 to be collected in dehydration accumulator 27.

After the dehydration process, the distillation column 23 is isolated from vessel 11 by closing valves 22 and 24. The monomer (e.g., p-dichlorobenzene "DCB") is then added through line 29 into line 15 which introduces the monomer into vessel 11. The mixture in vessel 11 is then stirred while being heated, by heating coils 19, to a temperature sufficient to effect the polymerization of the monomeric material.

After the polymerization reaction is completed, a sufficient amount of a phase separation agent is added into vessel 11 through line 12. It is believed that the addition of a phase separation agent facilitates the separation of a molten poly(phenylene sulfide) phase from a second liquid phase comprising the polar organic compound, phenylene sulfide oligomers, salt, and unreacted reactants. After the phase separation agent has been added, the reaction mixture is vigorously stirred by agitator 33 and the temperature of the reactor is reduced so that the liquid polymeric phase gradually solidifies as the temperature of the reaction mixture drops below the polymer's melt crystallization temperature.

The reaction mixture effluent, comprising the particulate virgin polymeric resin, polar organic compound, salt, and water, is then transferred through line 35 into stirred dilution tank 55. Water is added through line 39 in a sufficient quantity to dissolve the major portion of soluble salts.

The effluent slurry from tank 55 is transferred through line 57, pump 59 and line 61 to porous metal screen 63 where solids are collected as a filter cake, comprising of particulate virgin poly(phenylene sulfide)

resin, water, and small amounts of the polar organic compound and impurities, while the filtrate is passed through line 65 and sent for recovery of the polar organic compound.

The polymeric filter cake, from porous metal screen 63, comprising the virgin resin, is passed through line 83 along with deionized water added through line 85 to be slurried in wash tank 87 which is an agitated tank providing contact between the slurry and the wash water to further deash the virgin poly(phenylene sulfide) particles. Effluent from tank 87 is passed through line 89, pump 91 and line 93 to a second porous metal screen 95 where solids are again collected as a polymeric filter cake and comprising a virgin resin. The filtrate is passed through line 96. The filtrate is passed through line 96 and is generally either recycled (not shown) or discarded.

The polymeric filter cake from porous metal screen 95, comprising virgin resin, is passed through line 97 to wash tank 99 which is another agitated vessel. It is in this wash vessel that the virgin poly(phenylene sulfide) resin is treated in accordance with the processes of this invention. Specifically, if the virgin resin is treated in accordance with the one embodiment of the invention, the virgin poly(phenylene sulfide) filter cake is passed through line 97 along with a buffer solution added through line 98 into wash tank 99. The virgin poly(phenylene sulfide) filter cake is then reslurried in wash tank 99. After reslurrying, wash tank 99 is purged with nitrogen gas to remove substantially all of any gaseous oxidizing atmosphere which may be present. Wash tank 99 is then blocked off using valves 90, 92 and 94.

While stirring, the polymer slurry in tank 99 is heated by means of heat transfer coil 100, to a temperature not exceeding the melting point of the virgin poly(phenylene sulfide) resin (i.e., 285° C.). The polymer slurry is then cooled and wash tank 99 is vented through valve 94 and line 104. The cooled effluent from wash tank 99 is passed through line 101, pump 103, and line 105 to a third porous metal screen 107. Solids are again collected comprising a now treated poly(phenylene sulfide) resin. The filtrate is passed through line 106 and is generally either recycled (not shown) or discarded. The polymeric filter cake, comprising the now treated poly(phenylene sulfide) resin, is washed with water from line 109. The polymeric filter cake is transferred through line 111 as recovered, treated poly(phenylene sulfide) which is then dried and, optionally, air-cured.

When practicing the other embodiment of this invention, the virgin poly(phenylene sulfide) filter cake from porous metal screen 95 is reslurried in wash tank 99 with a sufficient amount of water being added through line 98. After reslurrying, wash tank 99 is purged with nitrogen gas to remove substantially all of any gaseous oxidizing atmosphere which may be present. Wash tank 99 is then blocked off using valves 90, 92 and 94.

The polymer slurry in wash tank 99 is heated, by means of heat transfer coil 100, to a temperature not exceeding the melting point of the virgin poly(phenylene sulfide) resin. A buffer solution is then added to the heated polymer slurry in wash tank 99 through line 102. The polymer slurry containing the buffer solution is then agitated while being maintained at the elevated temperature. The polymer slurry is then cooled and wash tank 99 is vented through valve 94 and line 104. The cooled effluent from wash tank 99 is then passed through line 101, pump 103 and line 105 to a third porous metal screen 107. Solids are again collected comprising a now treated poly(arylene sulfide) resin. The filtrate is passed through line 106 and is generally either recycled (not shown) or discarded. The polymeric filter cake, comprising the now treated poly(phenylene sulfide) resin, is washed with water from line 109. The polymeric filter cake is then transferred to line 111 as recovered, treated poly(phenylene sulfide) which is then dried and, optionally, air-cured.

In either of the above embodiments, the treating and drying processes of the poly(phenylene sulfide) resin should result in substantially no oxidative curing of the polymeric resin. In other words, if the resin is subjected to an elevated temperature, an oxidizing atmopshere should not be present. For example, if the drying process is conducted at a temperature at or above 100° C., the drying vessel should be substantially free of any gaseous oxidizing atmosphere. If, however, the drying process is conducted at a temperature below 100° C., drying must be done in a vacuum so that the aqueous component of the polymeric filter cake can be vaporized. Moreover, it should be noted that if drying is conducted at a temperature below 100° C., the presence of a gaseous oxidizing atmosphere will generally not result in a curing of the treated resin.

As stated above, after the treated poly(phenylene sulfide) resin has been dried, it can optionally be cured. The curing process of an arylene sulfide resin generally entails subjecting the resin to an elevated temperature, below its melting point, while in the presence of a gaseous oxidizing atmosphere. Any suitable gaseous oxidizing atmosphere can be used. Examples of suitable gaseous oxidizing atmospheres include, but are not limited to, oxygen, any mixture of oxygen and an inert gas, such as nitrogen, or air. Generally, due to economic feasibility, air is often preferred. The curing temperature of arylene sulfide resins is generally in the range from about 1° C. to about 110° C. below the melting point of the treated resin, preferably, from about 14° C. to about 85° C. below the melting point of the treated resin.

Treating a virgin arylene sulfide resin in accordance with this invention results in a thermally stable resin which cures faster than its untreated counterpart. This result is desirable since it enables one to cure an arylene sulfide resin to a desired melt flow value either (a) in a shorter period of time and/or (b) at a lower curing temperature.

Another advantage of treating a virgin arylene sulfide resin in accordance with this invention is that a treated resin will have a melt flow value greater than its untreated counterpart. In other words, a virgin arylene sulfide resin which has been treated in accordance with this invention will have greater flowing tendencies (i.e., will be less viscous) than its untreated counterpart. This result is also desirable, especially if the resin is to be employed for encapsulation and/or coating purposes.

Depending upon the pH of the buffer solution used in treating a virgin arylene sulfide resin, the degree at which the melt flow value of the treated resin increases will vary. For example, depending upon the pH of the buffer solution selected, the melt flow value of the treated resin can range from about 50% to about 250% greater than the melt flow value of the resin's untreated counterpart. Since resins which are useful for encapsulation and/or coating purposes, generally have melt flow values greater than 15,000 g/10 min., when treating a virgin arylene sulfide resin to be suitable for encapsulation and/or coating purposes, the virgin arylene sulfide resin, prior to being treated, will generally have a melt flow value greater than 4500 g/10 min., preferably, greater than 6000 g/10 min., more preferably greater than 7500 g/10 min, and even more preferably greater than 9000 g/10 min.

The invention will still more fully be understood from the following examples. These examples are only intended to demonstrate select embodiments of the invention and are, in no way, intended to limit the scope thereof.

EXAMPLE I

This Example demonstrates treating a virgin poly(-phenylene sulfide) (henceforth PPS) resin, commercially available from Phillips Petroleum Company as Ryton® PPS, having a melting point of about 285° C. (545° F.) and an initial melt flow rate ranging from about 2,000 to about 6,000 g/10 min as determined by a modified ASTM D1238 Procedure B which uses a 5 minute preheat time (henceforth, modified ASTM D1238).

In this example, portions of the virgin PPS resin was treated by slurrying a polymeric filter cake, comprising approximately 50 weight percent of the virgin PPS resin, and 50 weight percent of distilled water, with four different buffer solutions. Each slurry was then subjected to an elevated temperature below the melting point of the virgin PPS resin. These buffer solutions were prepared as follows.

A 10.698 gram (0.2 mole) sample of $NH_4Cl$ was dissolved in distilled water to make a 1.0 liter solution (i.e., Solution 1). An 11.13 mL (0.2 mole) sample of concentrated $NH_4OH$ was diluted in distilled water to make a 1.0 liter solution (i.e., Solution 2). Appropriate amounts of Solutions 1 and 2 were mixed so as to produce 1.6 liters of a 0.2 molar ammonia buffer solution (i.e., Buffer 1) having a pH of 9.25.

A 13.65 mL (0.2 mole) sample of concentrated $H_3PO_4$ was diluted with distilled water to make a 1.0 liter solution (i.e., Solution 3). A 28.392 gram (0.2 mole) sample of anhydrous $Na_2HPO_4$ was dissolved in distilled water to make a 1.0 liter solution (i.e., Solution 4). Solution 4 was titrated with Solution 3 until a pH of 7.0 was attained. The resulting solution was a 0.2 molar phosphate buffer solution (i.e., Buffer 2) with a pH of 7.0.

A 11.45 mL (0.2 mole) sample of glacial acetic acid was diluted with distilled water to make a 1.0 liter solution (i.e., Solution 5). A 1.641 gram (0.2 mole) sample of anhydrous sodium acetate was mixed with distilled water to make a 1.0 liter solution, (i.e., Solution 6). Appropriate amounts of Solutions 5 and 6 were mixed so as to produce a 0.2 molar acetic buffer solution (i.e., Buffer 3) having a pH of 3.75.

To simulate commercial conditions, 120 grams of a PPS filter cake comprising approximately 60 grams of the above-identified virgin PPS resin and approximately 60 mL water, were charged to a stirred 1-liter autoclave reactor. The filter cake was then slurried by adding approximately 500 ml of Buffer 1. The reactor was deaerated to remove substantially all of any gaseous oxidizing atmosphere. The deaerated reactor, containing the polymer slurry, was then heated to 190° C. (374° F.) while the contents therein were being stirred.

This process continued for approximately one hour, at 190° C. (374° F.), after which time the polymer slurry was cooled to approximately 21° C. (70° F.). The treated PPS resin was recovered from the polymer slurry by filtration. The filtrate collected from the polymer slurry had a pH of 9.25. The treated, recovered, PPS resin was then washed several times with water and allowed to dry at 50° C. (122° F.) for approximately 16 hours while under vacuum conditions. Hereinafter, this resin will be referred to as Resin 1.

A series of 12-gram samples of Resin 1 were cured by being heated at 264° C. (507° F.) for various periods of time, none to exceed 6 hours, while in the presence of air. At various time intervals during this curing process, one sample, from the series of 12-gram samples, was removed from the oven. The melt flow value of this particular 12-gram sample was measured according to the modified ASTM D1238 procedure described earlier. The observed results are recorded in Table I.

Two additional samples of the same virgin PPS resin were slurried in buffer solutions, recovered, dried, and cured in accordance with the same procedure as set out for Resin 1. The resulting PPS resins will be referred to as Resins 2 and 3. The only significant difference between the treatment of Resin 1 and that of Resins 2 and 3 was the buffer solution used. Specifically, Resin 2 was treated with Buffer 2 which had a pH of 7.0. The pH of the filtrate collected from the polymer slurry containing the treated PPS Resin 2 was 7.03. Resin 3 was treated with Buffer 3 which had a pH of 3.75. The pH of the filtrate collected from the polymer slurry containing the treated PPS Resin 3 was 4.58. Resin 4 was treated with Buffer 4. The resulting melt flow values of Resins 2 and 3, at varying time intervals during the curing process, are also recorded in Table I.

For the purposes of demonstrating the effectiveness of this invention, two control resins (i.e., Resins 4 and 5) were prepared. Resin 4 was prepared by a process similar to that of Resin 1. In the preparation of Resin 4, the polymeric filter cake, comprising the above-described virgin PPS resin was slurried with a 0.2 molar $Na_3PO_4$ solution having a pH of 11.6. This solution, used to treat Resin 4, was prepared by dissolving a 76.03 gram sample of $Na_3PO_412H_2O$ in distilled water to make a 1.0 liter solution. The pH of the filtrate collected from the polymer slurry containing the treated PPS Resin 4 was 11.56.

Resin 5 was also prpared by a process similar to that of Resin 1. In the preparation of Resin 5, the polymeric filter cake, comprising the above-described virgin PPS resin was slurried with distilled water, as opposed to being treated by a buffer solution. While the distilled water had an initial pH of about 7, the filtrate collected from the polymer slurry containing PPS Resin 5 had a pH of 9.40. The melt flow values of Resins 4 and 5 at various time intervals of the curing process are also recorded in Table I.

TABLE I

Effect of Treating a Polymeric Resin with a Buffer Solution on the Resin's Rate of Cure

| Resin No. | Treating Agent | pH Initial | pH Filtrate | PPS Flow Rate[1] (g/10 min.) After Heating at 507° F. in the Presence of Oxygen for: 0 Hr. | 0.5 Hr. | 1 Hr. | 1.5 Hrs. | 2 Hrs. | 2.5 Hrs. | 3 Hrs. | 4 Hrs. | 5 Hrs. | 6 Hrs. |
|---|---|---|---|---|---|---|---|---|---|---|---|---|---|
| 1 | Buffer 1 | 9.25 | 9.25 | —[2] | — | 142 | 19 | 2.5 | — | — | — | — | — |

TABLE I-continued

Effect of Treating a Polymeric Resin with a Buffer Solution on the Resin's Rate of Cure

| Resin No. | Treating Agent | pH | | PPS Flow Rate[1] (g/10 min.) After Heating at 507° F. in the Presence of Oxygen for: | | | | | | | | | |
|---|---|---|---|---|---|---|---|---|---|---|---|---|---|
| | | Initial | Filtrate | 0 Hr. | 0.5 Hr. | 1 Hr. | 1.5 Hrs. | 2 Hrs. | 2.5 Hrs. | 3 Hrs. | 4 Hrs. | 5 Hrs. | 6 Hrs. |
| | (invention) | | | | | | | | | | | | |
| 2 | Buffer 2 (invention) | 7.0 | 7.03 | — | 320 | — | 70 | — | 15 | 6.5 | — | — | — |
| 3 | Buffer 3 (invention) | 3.75 | 4.58 | — | 405 | 50 | 35 | — | — | — | — | — | — |
| 4 | $Na_3PO_4$ (control) | 11.6 | 11.58 | — | 356 | 210 | — | 154 | — | 94 | 35 | — | 16 |
| 5 | $H_2O$ (control) | 7.0 | 9.40 | 3000 | — | 161 | — | 67 | — | 35 | 25 | 19 | — |

[1]Flow rate determined in accordance with modified ASTM D1238.
[2]Dashes "—" represent that the melt flow value for the give resin at that specific time interval was not determined.

Figure 2:
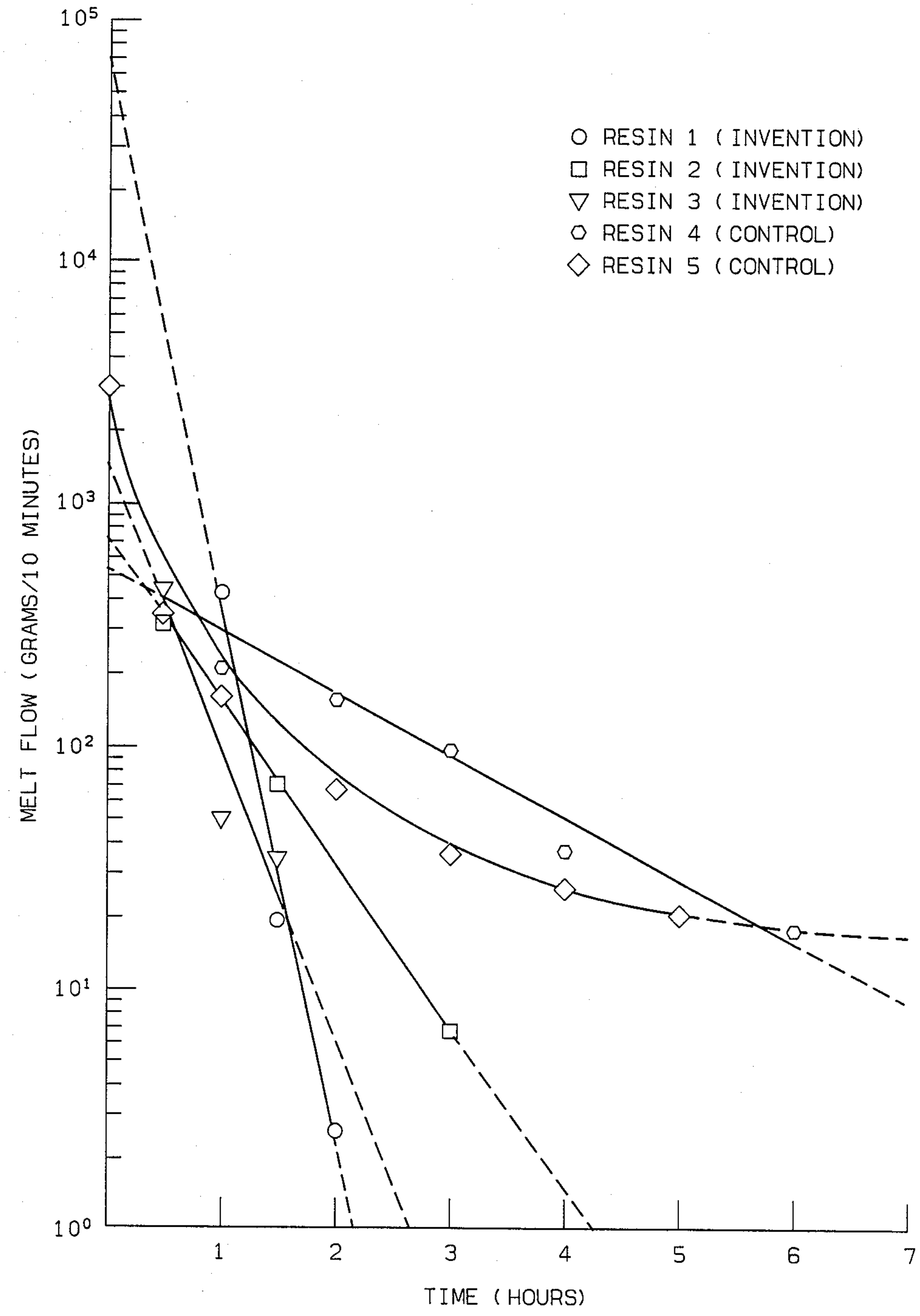
FIG. 2 is a semi-log graph demonstrating the effectiveness of contacting a virgin arylene sulfide resin with a buffer solution having a pH less than about 9.35 but greater than that which is necessary to result in at least a partial curing of the virgin resin. Specifically, FIG. 2 plots the hours necessary to cure a treated poly(phenylene sulfide) resin to particular melt flow values and comparing the values with the time necessary to cure the untreated poly(phenylene sulfide) resin.

To visually implement the demonstration of this invention's effectiveness, the data from Table I has been plotted on the graph shown in FIG. 2. Specifically, FIG. 2 plots the melt flow value of a PPS resin as a function of the time the resin was subjected to the set curing conditions. This plot demonstrates the rate at which the resins cure under the specific conditions.

When comparing the melt flow values of inventive Resins 1-3 with those of control Resins 4 and 5, the data demonstrate that slurrying a virgin PPS resin in a buffer solution having a pH less than about 9.35 and then heating the polymer slurry to a temperature below the melting point of the resin, while in the substantial absence of a gaseous oxidizing atmosphere, results in a pronounced acceleration of the rate at which a PPS resin cures. Specifically, under the set curing conditions, inventive Resins 1, 2 and 3 were cured to a melt flow value of 20 g/10 min. in approximately 1.5 hours, 2.3 hours, and 1.2 hours, respectively. However, under the identical curing conditions, it took approximately 5.5 hours to cure control Resin 4 to a melt flow value of 20 g/10 min. and approximately 5 hours to cure control Resin 5 to a melt flow value of 20g/10 min.

It is evident from the foregoing that various modifications can be made to the embodiments of this invention without departing from the spirit and scope thereof which will be apparent to those skilled in the art. Having thus described the invention, it is claimed as follows.

That which is claimed is:

1. A process for treating a particular virgin arylene sulfide resin to produce an uncured treated arylene sulfide resin having an increased cure rate comprising:

(a) preparing a slurry, wherein the solid component of said slurry comprises said particulate virgin arylene sulfide resin, and wherein the liquid component of said slurry comprises an aqueous buffer solution, wherein said buffer solution has a pH less than about 9.35 but greater than that necessary to result in curing of said virgin arylene sulfide resin, (b) heating said slurry, while in the substantial absence of a gaseous oxidizing atmosphere, to an elevated temperature below the melting point of said virgin arylene sulfide resin, for a time sufficient to increase the cure rate of said particulate virgin arylene sulfide, and (c) recovering the resulting treated particulate arylene sulfide resin from said slurry in a manner which does not result in curing of said treated particulate arylene sulfide resin.

2. A process as in claim 1 wherein, prior to contacting said particular virgin resin with said buffer solution, said particulate virgin resin is recovered from a polymerization reaction effluent comprising said particulate virgin resin, salt, a polar organic compound and water.

3. A process as in claim 1 wherein, after step (c), said particulate treated resin is dried, while in the substantial absence of a gaseous oxidizing atmosphere, at an elevated temperature below the melting point of said particulate treated resin.

4. A process as in claim 1 wherein, after step (c), said particulate treated resin is dried at a temperature not exceeding 100° C. and under vacuum conditions sufficient to vaporize any liquid component.

5. A process as in claim 3 wherein, after said particulate treated resin is dried, said particulate treated resin is heated to an elevated temperature, below the melting point of said particulate treated resin, while in the presence of a gaseous oxidizing atmosphere, for a time sufficient to at least partially cure said particulate treated resin.

6. A process as in claim 5 wherein said gaseous oxidizing atmosphere is air.

7. A process as in claim 4 wherein, after said particulate treated resin is dried, said particulate treated resin is heated to an elevated temperature, below the melting point of said particulate treated resin, while in the presence of a gaseous oxidizing atomsphere, for a time sufficient to at least partially cure said particulate treated resin.

8. A process as in claim 7 wherein said gaseous oxidizing atmosphere is air.

9. A process as in claim 1 wherein during step (b) said slurry is heated to a temperature within the range from about 1° C. to about 165° C. below the melting point of said particulate virgin resin.

10. A process as in claim 9 wherein during step (b) said slurry is heated to a temperature within the range from about 14° C. to about 150° C. below the melting point of said particulate virgin resin.

11. A process as in claim 1 wherein prior to preparing said slurry the pH of said buffer solution ranges from about 2 to about 9.30.

12. A process as in claim 11 wherein prior to preparing said slurry the pH of said buffer solution ranges from about 4 to about 9.25.

13. A process as in claim 1 wherein said buffer solution is selected from the group consisting of a phosphate buffer having a pH of 7.0, an ammonia buffer having a pH of 9.25, and an acetate buffer having a pH of 3.75, wherein each of said pH value is that existing prior to preparing said slurry.

14. A process as in claim 13 wherein prior to preparing said slurry said buffer solution is said acetate buffer having a pH of 3.75.

15. A process as in claim 1 wherein prior to heating said slurry the concentration of said particulate virgin resin in said slurry ranges from about 1 weight percent to about 50 weight percent, said weight percentages being based on the total weight of said slurry prior to said heating step.

16. A process as in claim 15 wherein prior to said heating said slurry the concentration of said particulate virgin resin in said slurry ranges from about 5 weight percent to about 40 weight percent, said weight percentages being based on the total weight of said slurry prior to heating said slurry.

17. A process as in claim 16 wherein prior to said heating step the concentration of said particulate virgin resin in said slurry ranges from about 10 weight percent to about 30 weight percent, said weight percentages being based on the total weight of said slurry prior to said heating step.

18. A process as in claim 1 wherein, prior to contacting said particulate virgin resin with said buffer solution, said particulate virgin resin has a melt flow value of at least 4,500 grams/10 minutes.

19. A process as in claim 18 wherein, prior to contacting said particulate virgin resin with said buffer solution, said particulate virgin resin has a melt flow value of at least 6,000 grams/10 minutes.

20. A process as in claim 19 wherein, prior to contacting said particulate virgin resin with said buffer solution, said particulate virgin resin has a melt flow value of at least 7,500 grams/10 minutes.

21. A process as in claim 20 wherein, prior to contacting said particulate virgin resin with said buffer solution, said particulate virgin resin has a melt flow value of at least 9,000 grams/10 minutes.

22. A process as in claim 1 wherein said particulate virgin resin is a particulate virgin poly(arylene sulfide) resin.

23. A process as in claim 22 wherein said particulate virgin poly(arylene sulfide) resin is selected from the group consisting of poly(phenylene sulfide), poly(phenylene sulfide ketone), poly(phenylene sulfide diketone) and poly(biphenylene sulfide).

24. A process as in claim 23 wherein said particulate virgin poly(arylene sulfide) is poly(phenylene sulfide).

25. A process for treating a particulate virgin arylene sulfide resin to produce an uncured arylene sulfide resin having an increased cure rate comprising:

(a) preparing a slurry, wherein the solid component of said slurry comprises said particulate virgin arylene sulfide resin, and wherein the liquid component of said slurry comprises water,
(b) heating said slurry, while in the substantial absence of a gaseous oxidizing atmosphere, to an elevated temperature below the melting point of said particulate virgin resin,
(c) adding to said heated slurry, while in the substantial absence of a gaseous oxidizing atmosphere, a buffer solution, wherein said buffer solution prior to being added to said slurry has a pH of less than about 9.35 but greater than that necessary to result in curing of said particulate virgin arylene sulfide resin,
(d) maintaining the temperature of said slurry at said elevated temperature for a time sufficient to increase the cure rate of said particulate virgin arylene sulfide resin, and
(e) recovering the resulting arylene sulfide resin from said slurry in a manner which does not result in curing of said resulting particulate treated arylene sulfide resin.

26. A process as in claim 25 wherein, prior to contacting said particulate virgin resin with said buffer solution, said particulate virgin resin is recovered from a polymerization reaction effluent comprising said particulate virgin resin, salt, a polar organic compound and water.

27. A process as in claim 25 wherein, after step (e), said particulate treated resin is dried, while in the substantial absence of a gaseous oxidizing atmosphere, at an elevated temperature below the melting point of said particulate treated resin.

28. A process as in claim 25 wherein, after step (e), said particulate treated resin is dried at a temperature not exceeding 100° C. and under vacuum conditions sufficient to vaporize any liquid component.

29. A process as in claim 27 wherein, after said particulate treated resin is dried, said particulate treated resin is heated to an elevated temperature, below the melting point of said particulate treated resin, while in the presence of a gaseous oxidizing atmosphere, for a time sufficient to at least partially cure said particulate treated resin.

30. A process as in claim 29 wherein said gaseous oxidizing atmosphere is air.

31. A process as in claim 28 wherein, after said particulate treated resin is dried, said particulate treated resin is heated to an elevated temperature, below the melting point of said treated resin, while in the presence of a gaseous oxidizing atmosphere, for a time sufficient to at least partially cure said particulate treated resin.

32. A process as in claim 31 wherein said gaseous oxidizing atmosphere is air.

33. A process as in claim 25 wherein during steps (b), (c) and (d), the temperature of said heated slurry is from about 1° C. to about 175° C. below the melting point of said particulate virgin resin.

34. A process as in claim 33 wherein during steps (b), (c) and (d), the temperature of said heated slurry is from about 14° C. to about 150° C. below the melting point of said particulate virgin resin.

35. A process as in claim 25 wherein prior to adding said buffer solution to said slurry the pH of said buffer solution ranges from about 2 to about 9.30.

36. A process as in claim 35 wherein prior to adding said buffer solution to said slurry the pH of said buffer solution ranges from about 4 to about 9.25.

37. A process as in claim 25 wherein said buffer solution is selected from the group consisting of a phosphate buffer having a pH of 7.0, an ammonia buffer having a pH of 9.25, and an acetate buffer having a pH of 3.75, wherein each of said pH value is that existing prior to adding said buffer solution to said slurry.

38. A process as in claim 37 wherein said buffer solution is said acetate buffer having a pH of 3.75.

39. A process as in claim 25 wherein the concentration of said particulate virgin resin in said slurry ranges from about 1 weight percent to about 50 weight percent, said weight percentages being based on the total weight of said slurry, after said buffer solution is added to said slurry.

40. A process as in claim 39 wherein the concentration of said particulate virgin resin in said slurry ranges from about 5 weight percent to about 40 weight percent, said weight percentages being based on the total weight of said slurry, after said buffer solution is added to said slurry.

41. A process as in claim 40 wherein the concentration of said particulate virgin resin in said slurry ranges from about 10 weight percent to about 30 weight percent, said weight percentages being based on the total weight of said slurry, after said buffer solution is added to said slurry.

42. A process as in claim 25 wherein prior to forming said slurry of said virgin resin with said water, said particulate virgin resin has a melt flow value of at least 4,500 grams/10 minutes.

43. A process as in claim 42 wherein, prior to forming said slurry of said virgin resin with said water, said particulate virgin resin has a melt flow value of at least 6,000 grams/10 minutes.

44. A process as in claim 43 wherein, prior to forming said slurry of said virgin resin with said water, said particulate virgin resin has a melt flow value of at least 7,500 grams/10 minutes.

45. A process as in claim 44 wherein, prior to forming said slurry of said virgin resin with said water, said particulate virgin resin has a melt flow of at least 9,000 grams/10 minutes.

46. A process as in claim 25 wherein said particulate virgin resin is a particulate virgin poly(arylene sulfide) resin.

47. A process as in claim 46 wherein said particulate virgin poly(arylene sulfide) resin is selected from the group consisting of poly(phenylene sulfide), poly(phenylene sulfide ketone), poly(phenylene sulfide diketone) and poly(biphenylene sulfide).

48. A process as in claim 47 wherein said particulate virgin poly(arylene sulfide) is poly(phenylene sulfide).

49. A process for treating a particulate virgin arylene sulfide resin to obtain an uncured modified particulate arylene sulfide resin having an increased cure rate comprising:

(a) contacting said particulate virgin arylene sulfide resin with an aqueous buffer solution to form an aqueous slurry, wherein said buffer solution has a pH less than about 9.35 but greater than that necessary to result in curing of said virgin arylene sulfide resin, (b) heating said slurry, in the substantial absence of a gaseous oxidizing atmosphere, to an elevated temperature below the melting point of said virgin resin for a suitable period of time to produce a modified particulate arylene sulfide resin having an increased cure rate, and (c) recovering said modified particulate arylene sulfide resin from said slurry in a manner which does not result in curing of said modified particulate arylene sulfide resin.

50. A process according to claim 49 wherein said particulate virgin arylene sulfide resin prior to contacting with said aqueous buffer has a melting point of at least about 200 degrees C.

51. A process according to claim 50 wherein step (b) is carried out at a temperature in the range of about 1 to about 165 degrees C below the melting point of said particulate virgin arylene sulfide resin.

52. A process according to claim 51 wherein said particulate virgin arylene sulfide resin prior to contacting with said aqueous buffer has a melting point in the range of about 200 degrees C to about 500 degrees C.

53. A process according to claim 52 wherein step (b) is carried out at a temperature in the range of about 14 to about 150 degrees C below the melting point of said particulate virgin arylene sulfide resin.

54. A process according to claim 53 wherein said buffer solution is selected from the group consisting of a phosphate buffer solution prepared from a mixture of $H_3PO_4$ and $Na_2HPO_4$, an acetate buffer solution prepared from a mixture of acetic acid and sodium acetate, and an ammonium buffer solution prepared from a mixture of $NH_4OH$ and ammonium chloride.

55. A process according to claim 54 wherein said buffer solution prior to being contacted with said virgin arylene sulfide resin has a pH in the range of about 2 to about 9.3.

56. A process according to claim 54 wherein said buffer solution prior to being contacted with said virgin arylene sulfide resin has a pH in the range of about 4 to about 9.25

57. A process according to claim 56 wherein said buffer solution prior to being contacted with said virgin arylene sulfide resin is an ammonium buffer solution having a pH of 9.25.

58. A process according to claim 57 wherein said buffer solution prior to being contacted with said virgin arylene sulfide resin is 0.2 molar ammonia.

59. A process according to claim 58 wherein step (b) is conducted at a temperature in the range of 35 to 499 degrees C.

60. In a process for the preparation of polyarylene sulfide comprising subjecting an alkali metal hydrosulfide and a dihalo-aromatic compound to reaction in a polar organic compound to form a polyarylene sulfide, the improvement which comprises subjecting the polymer formed separated from the polymerization mixture to a treatment, without causing substantial cure of said polymer with an aqueous solution having a pH of 9.25 comprising a mixture of ammonium chloride and ammonium hydroxide 0.2 M in ammonia under conditions suitable for producing a polyarylene sulfide having an increased melt flow rate, said conditions including a temperature below the melting point of said polymer.

61. A process for the preparation of polyarylene sulfide according to claim 60 wherein the polymer separated from the polymerization mixture with the polar organic solvent adhering thereto is subjected to the treatment.

62. A process for the preparation of polyarylene sulfide according to claim 60 wherein the polymer separated from the polymerization mixture with the polar organic solvent adhering thereto is washed with a solvent in which the polar organic solvent dissolves and the polymer thus washed with the washing solvent adhering thereto is subjected to the treatment.

* * * * *